US008618985B2

(12) United States Patent
Park et al.

(10) Patent No.: US 8,618,985 B2
(45) Date of Patent: Dec. 31, 2013

(54) PATCH ANTENNA AND RECTENNA USING THE SAME

(75) Inventors: Jun-seok Park, Seoul (KR);
Ha-Ryoung Oh, Goyang-si (KR);
Yeong-Rak Seong, Seoul (KR);
Hyoung-Hwan Roh, Seoul (KR);
Ki-won Seo, Seoul (KR)

(73) Assignee: Kookmin University Industry Academy Cooperation Foundation, Seoul (KR)

( * ) Notice: Subject to any disclaimer, the term of this patent is extended or adjusted under 35 U.S.C. 154(b) by 578 days.

(21) Appl. No.: 12/758,987

(22) Filed: Apr. 13, 2010

(65) Prior Publication Data

US 2011/0242863 A1 Oct. 6, 2011

(30) Foreign Application Priority Data

Mar. 31, 2010 (KR) .................. 10-2010-0029261
Mar. 31, 2010 (KR) .................. 10-2010-0029262
Mar. 31, 2010 (KR) .................. 10-2010-0029263

(51) Int. Cl.
*H01Q 1/38* (2006.01)
(52) U.S. Cl.
USPC .................. 343/700 MS; 343/846; 343/860
(58) Field of Classification Search
USPC .................. 343/700, 850, 860, 846
See application file for complete search history.

(56) References Cited

U.S. PATENT DOCUMENTS 5,068,669 A * 11/1991 Koert et al. ............ 343/700 MS
5,241,321 A * 8/1993 Tsao ...................... 343/700 MS
6,002,367 A * 12/1999 Engblom et al. ....... 343/700 MS
6,281,845 B1 * 8/2001 Ittipiboon et al. ..... 343/700 MS
6,842,140 B2 * 1/2005 Killen et al. ........... 343/700 MS

FOREIGN PATENT DOCUMENTS

| JP | 05114811 | 5/1993 |
|---|---|---|
| JP | 09219618 | 8/1997 |
| KR | 1020070063959 | 6/2007 |
| KR | 1020090011509 | 2/2009 |

OTHER PUBLICATIONS

L Giauffret, Backing of microstrip patch antennas fed by coplanar waveguides, 26th EuMC, 1996, pp. 281-283.
Deng, et al., Analysis of Coplanar Waveguide-Fed Microstrip Antennas, IEEE Transactions on Antennas and Propagation, vol. 43, No. 7, 1995, pp. 734-737.

* cited by examiner

*Primary Examiner* — Tho G Phan
(74) *Attorney, Agent, or Firm* — Cantor Colburn LLP

(57) ABSTRACT

A patch antenna for receiving high frequency wireless signal and a rectenna using the same, more particularly, an impedance-matched patch antenna adopting a slot capacitive coupling structure and a rectenna capable of generating electrical energy from the wireless signals having different frequency band. A rectenna for receiving an A.C. wireless signal carrying electrical energy and converting the wireless signal into a D.C. electrical energy, is comprised of: a patch antenna for receiving the wireless signal comprising an dielectric substrate, a patch that is formed at the upper area of the surface of the dielectric substrate and providing the first frequency response characteristics, a ground plane formed on the other surface of the dielectric substrate, and an impedance matching means providing the second frequency response characteristics; and a rectifying unit that converts the wireless signal, received via the patch antenna, into a D.C. electrical energy by rectifying the wireless signal.

4 Claims, 11 Drawing Sheets

PATCH ANTENNA AND RECTENNA USING THE SAME

BACKGROUND OF THE INVENTION

1. Field of the Invention

This invention relates to a patch antenna for receiving high frequency wireless signal and a rectenna using the same, more particularly, to an impedance-matched patch antenna adopting a slot capacitive coupling structure and a rectenna capable of generating electrical energy from the wireless signals having different frequency band.

2. Description of the Related Art

A patch antenna according to the first example of prior art is illustrated in FIG. 1. A patch antenna 10 illustrated in FIG. 1 adopts an in-set structure, wherein impedance matching is achieved by adjusting design parameters (a, b) of the gap 122 formed at each side of the feeder line 121 that is a partial extension from the bottom side of the patch 12 which is formed on a surface of the dielectric substrate 11.

According to the first example of prior art, forming the minute gaps at both sides of the feeder line 121 is a very difficult process; furthermore, the impedance matching condition gets easily out of control due to a small variation in process parameters during actual fabrication of a patch antenna.

In addition, since the gaps 122, located at the both sides of the feeder line 121 which is an impedance matching means, are formed inside the patch 12 as an integrated part thereof, the expensive patch 12 has to be newly fabricated in case when a problem occurs during the gap forming process.

A patch antenna according to the second example of prior art is illustrated in FIG. 2. The patch antenna 20, having a dual frequency band characteristics, of the second example of prior art is comprised of an dielectric substrate 21, an external patch 22, and an internal patch 23 as illustrated in FIG. 2.

The patch antenna 20 of the second example of prior art is capable of transmitting and receiving both signals having two different frequency bands by adopting an external patch 22 and an internal patch 23 having different frequency characteristics.

But, since this type of patch antenna utilizes two patches in transmitting and receiving signals having two different frequency bands, it requires high production cost and large antenna size to integrate two types of patch into a stacked form.

A rectenna according to an example of the prior art is illustrated in FIG. 3. The rectenna 30, shown in FIG. 3, relates to a rectenna that utilizes a loop antenna; it is largely comprised of a loop antenna 31 and a rectifying circuit 32; it converts an A.C. wireless signal received via the loop antenna 31 into a D.C. electrical energy by rectifying the A.C. wireless signal in the rectifying circuit 32, and supplies this electrical energy to the load 33.

Since such rectenna 30 of the prior art has only one frequency characteristics depending on the characteristics of the loop antenna 31, the electrical energy cannot be supplied to the load 33 if a wireless signal having the frequency band matched in frequency characteristics of the rectenna 30 is not received.

Furthermore, the rectenna 30 of the prior art simply rectifies the received wireless signal, so the wireless signal must be amplified before transmitting the wireless signal to the rectenna 30 when the load 33 needs a high voltage.

BRIEF SUMMARY OF THE INVENTION

The first objective of this invention, to solve above-described problems, is to provide a patch antenna having structures for an easy impedance matching.

The second objective of this invention is to provide a dual-band patch antenna having dual-band signal characteristics using a single patch.

The third objective of this invention is to provide a dual-band patch antenna capable of transmitting and receiving a circularly polarized wave and a linearly polarized wave in two different frequency bands.

The fourth objective of this invention is to provide a rectenna capable of generating an additional electrical energy by receiving non-relevant signals such as Wi-Fi or Bluetooth signal existing in free space mixed with the signals which are generally utilized for wireless power transmission.

The fifth objective of this invention is to provide a rectenna capable of generating higher voltage than that of the rectified energy obtained by rectifying the input signal from the voltage multiplying circuit.

Other objectives and advantages of the present invention will be described hereinafter and become apparent through the exemplary embodiments of the present invention. The objectives and advantages of the present invention can be accomplished through the means and combination of the elements of the claims.

A patch antenna in accordance with a preferred exemplary embodiment of the present invention to solve above-described problems is comprised of: an dielectric substrate; a patch that is formed on the first surface of the dielectric substrate and assigns the first frequency characteristics; and a ground plane that is formed on the second surface of the dielectric substrate, wherein an impedance matching means, that is capacitively coupled with the patch, is formed on the one side of the ground plane.

According to the patch antenna of the present invention, it is preferred that the impedance matching means is comprised of: a slot formed in the bottom area of the ground plane; and a feeder line formed inside of the slot and being separated by a predetermined distance therefrom.

According to the patch antenna of the present invention, it is preferred that the feeder line is formed at a location where the feeder line can face the bottom area of the patch with the dielectric substrate interposed between one end of the feeder line and the patch.

According to the patch antenna of the present invention, it is preferred that the slot and the feeder line is to be formed in a T-shaped pattern, wherein the feeder line is formed at a location where the bar-shaped head of the feeder line can face the bottom area of the patch so as to provide the second frequency response by adjusting the size of the slot and the feeder line.

According to the patch antenna of the present invention, the patch may be a hexagonal shape formed by etching off two facing corners of a square.

Meanwhile, a rectenna in accordance with a preferred exemplary embodiment of the present invention, for receiving an A.C. wireless signal carrying electrical energy and converting the wireless signal into a D.C. electrical energy, is comprised of: a patch antenna for receiving the wireless signal comprising an dielectric substrate, a patch that is formed at the upper area of the surface of the dielectric substrate and characterizing the first frequency response characteristics, a ground plane formed on the other surface of the dielectric substrate, and an impedance matching means characterizing the second frequency response characteristics; and a rectifying unit that converts the wireless signal, received via the patch antenna, into a D.C. electrical energy by rectifying the wireless signal.

According to the rectenna of the present invention, it is preferred that the rectifying unit is comprised of a voltage multiplying circuit that comprises multiple capacitors and diodes and at least two of serially connected rectifying and multiplying stages so as to convert the wireless signal into an electrical energy by rectifying the wireless signal and multiply the voltage of the converted electrical energy simultaneously.

Besides, according to the rectenna of the present invention, it is preferred that the rectifying unit is further comprised of: a grounding area that is being separated from the ground plane of the patch antenna; and a bead for suppressing the effect of the A.C. signal and located between the grounding area and the ground plane of the patch antenna.

According to the rectenna of the present invention, the bead may further include an inductor.

According to the rectenna of the present invention, it is preferred that the rectifying unit is installed on the same plane of the ground plane of the patch antenna.

According to the antenna of the present invention, a capacitive coupling between the patch and the feeder line is obtained through the structure wherein the slot is formed on the ground plane and the feeder line is formed inside of the slot; when compared to the patch antennas of conventional technology, more easy impedance matching can be achieved by adjusting the design parameters of the slot and the feeder line on the ground plane; therefore, additional fabrication of another expensive patch can be avoided even in the worst-case.

According to the antenna of the present invention, it has the advantage that the production cost can be reduced by using a single patch instead of two patches; even though it has a dual-band frequency response, the size of the antenna may not be increased because another frequency response different than that of the patch is provided through adjustment of the design parameters of the T-shaped slot and the T-shaped feeder line.

According to the antenna of the present invention, it has the advantage that it can handle various signals since a circularly polarized wave and a linearly polarized wave can be transmitted and received in two different frequency bands.

According to the rectenna of the present invention, it has the advantage that it can supply more stable power compare to the conventional rectenna since it can generate an additional electrical energy by receiving non-relevant signals such as Wi-Fi or Bluetooth signal existing in free space mixed with the signals which are generally utilized for wireless power transmission.

According to the rectenna of the present invention, it has the advantage that it can be applied to various equipments because higher voltage than that of the input signal can be obtained through two-stage voltage multiplication in the rectifying unit.

According to the rectenna of the present invention, it has the advantage that the space required to install a rectenna can be reduced since the overall size can be reduced by forming the rectifying unit on the ground plane of the antenna.

DETAILED DESCRIPTION OF THE INVENTION

Figure 1:
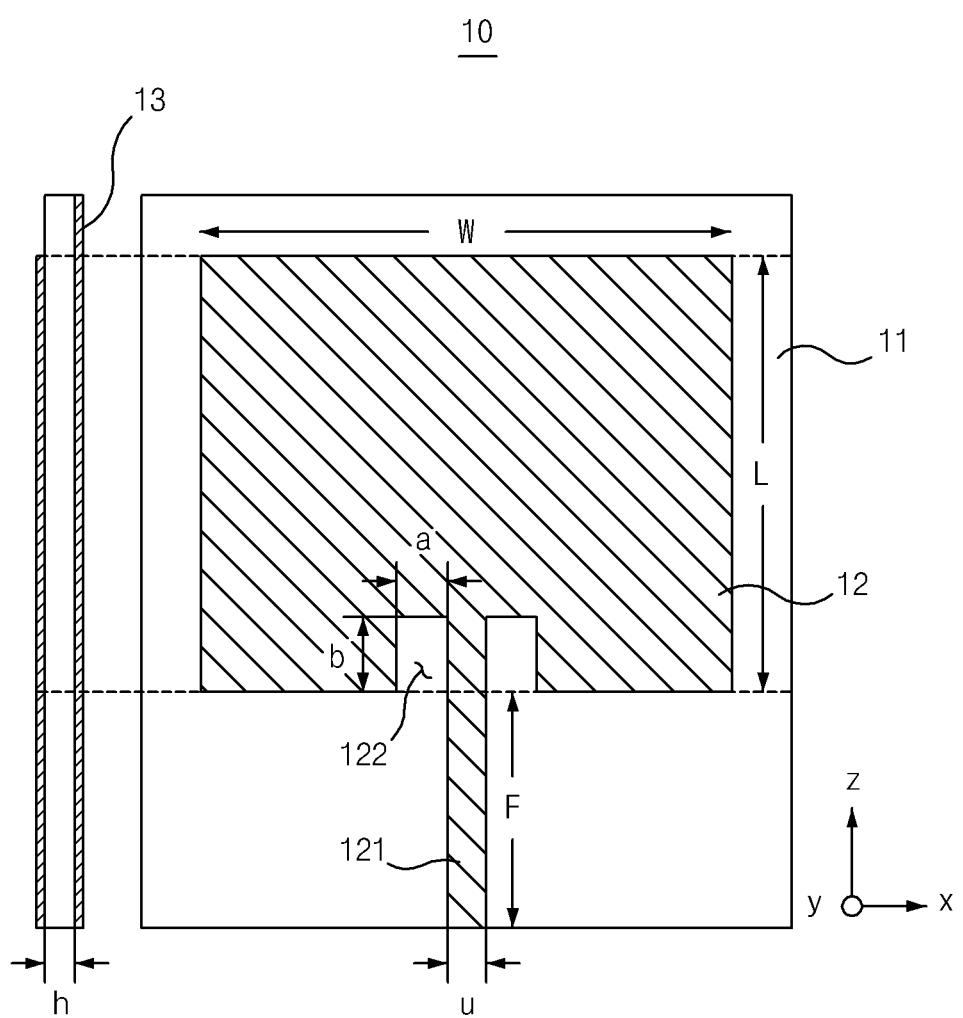
FIG. 1 is a schematic diagram of a patch antenna in accordance with a conventional technology.
Figure 2:
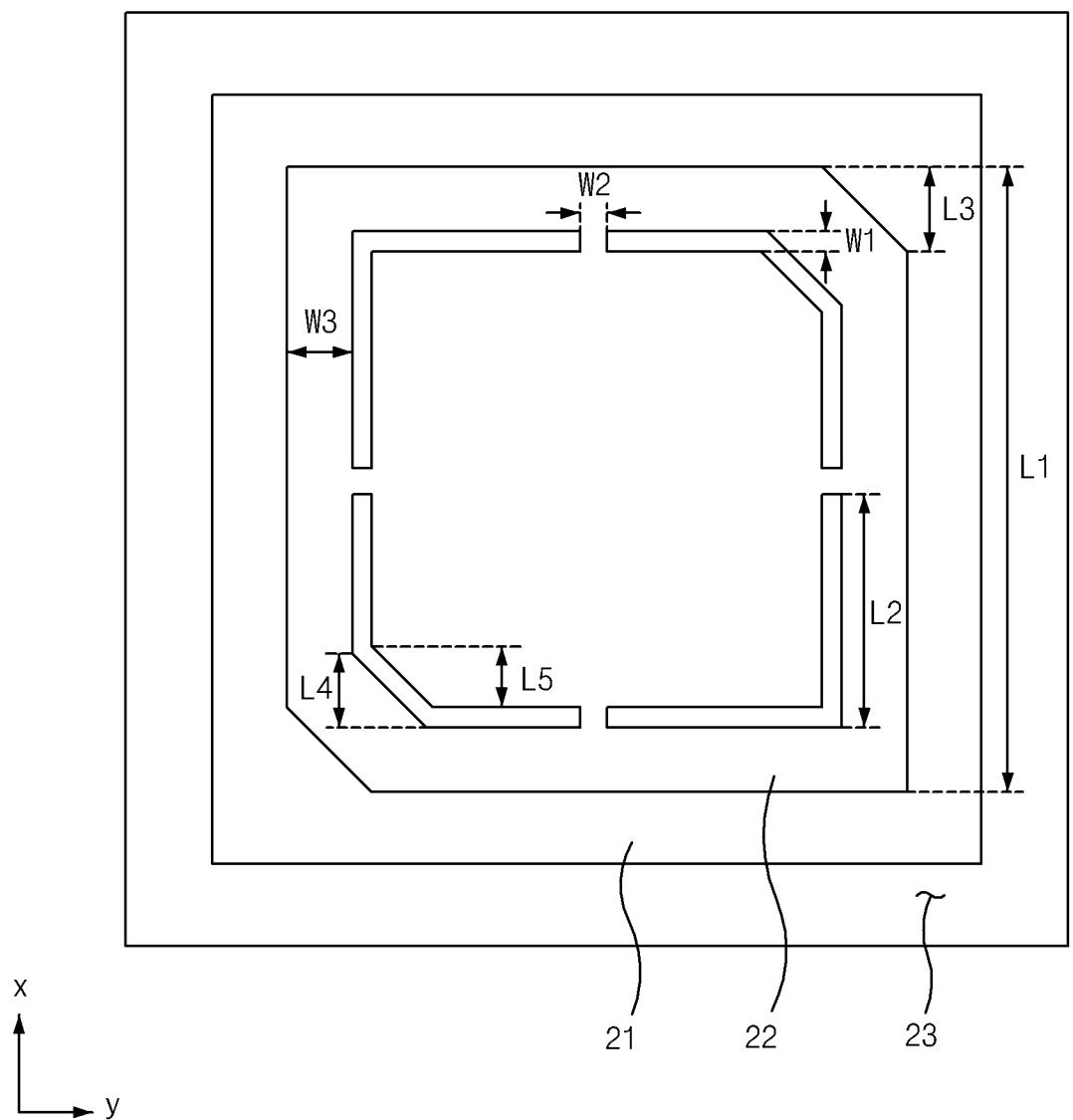
FIG. 2 is a schematic diagram of a patch antenna in accordance with another conventional technology.
Figure 3:
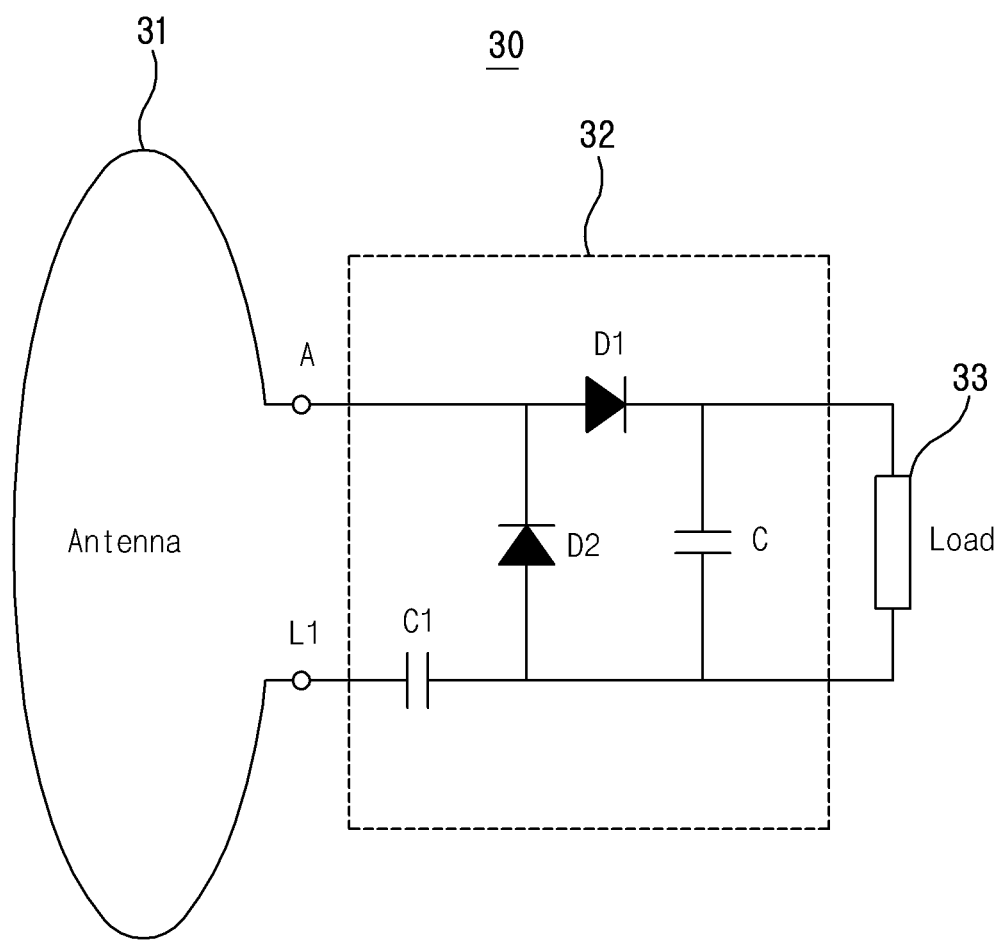
FIG. 3 is a schematic diagram of a rectenna in accordance with a conventional technology.

Hereinafter, preferred exemplary embodiments of the present invention will be described in detail with reference to the attached drawings. Terminology and word used in the description and the claims of the present invention should not be construed as a typical or a lexical meaning, but construed as a meaning and concept in accordance with the technical spirit of the present invention on the basis of the principle that the inventors may properly define the concept of a terminology in order to best describe his/her invention.

Therefore, it should be understood that a variety of equivalents and modification examples that can replace the exemplary embodiments and configurations described in the drawings may exist at the time of this patent application since these exemplary embodiments and configurations are only a few examples of the present invention and not representing all the technical spirits of the present invention.

Hereinafter, a patch antenna and a rectenna in accordance with the present invention will be described with reference to the attached drawings.

Figure 4:
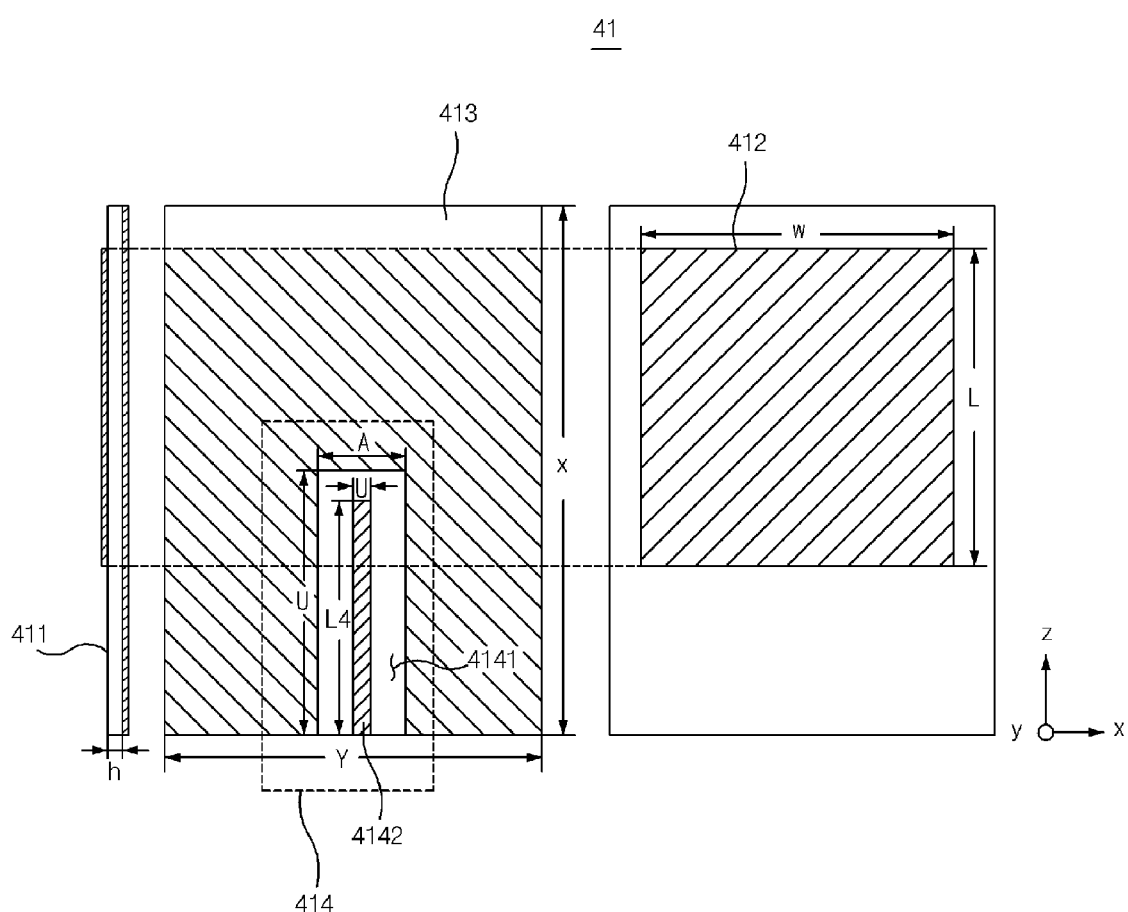
FIG. 4 is a schematic diagram of a patch antenna in accordance with a preferred exemplary embodiment of the present invention.

FIG. 4 is a schematic diagram of a patch antenna in accordance with a preferred exemplary embodiment of the present invention. As illustrated in FIG. 4, the patch antenna 41 in accordance with a preferred exemplary embodiment of the present invention, similar to conventional patch antenna, is comprised of an dielectric substrate 411, a patch 412 that is formed on a surface of the dielectric substrate 411, and a ground plane 413 that is formed on the other surface of the dielectric substrate 411.

The dielectric substrate 411, where a patch 412 and a ground plane 413 is formed on the opposite surface thereof facing each other, is made of a non-conducting dielectric material as the name implies.

Since this exemplary embodiment is based on the dielectric substrate 411 having thickness of 1 mm, the result of the following experiment can be affected if the thickness of the dielectric substrate 411 is different.

The patch 412 is the most essential element that determines the operating frequency of the patch antenna 41 according to the size and the shape of the patch 412; it is formed in the upper area of the first surface of the dielectric substrate 411 and provides the frequency response of the patch antenna 41. The patch antenna 41, for example, having a 29 mm square patch 412 may exhibit a linear polarized wave characteristics for frequencies around 2.4 GHz.

The patch antenna 41 of the present invention is for transmitting and receiving linearly polarized waves, and it is preferred to form the patch 412 in a square shape for transmitting and receiving such linearly polarized waves.

The ground plane 413 is formed on the other side of the patch 412, in other words, on the other surface of the dielectric substrate 411; in the present invention, the feeder line 4142 is formed on the same plane as the ground plane 413 in order to form a coplanar waveguide (CPW) structure.

In a preferred exemplary embodiment of the present invention as shown in FIG. 4, an impedance matching means 414 is formed inside of the ground plane 413, and the impedance matching means 414 is comprised of: a slot 4141 formed along the length direction of the ground plane 413; and a feeder line 4142 formed inside of the slot 4141 and being separated by a predetermined distance therefrom.

In here, the feeder line 4142 should be formed at a location where the feeder line can face the bottom area of the patch 412 with the dielectric substrate 411 interposed between one end of the feeder line and the patch.

Through above-described configuration of the present invention, the capacitive coupling between the feeder line and the patch is being accomplished.

According to the exemplary embodiment of the present invention, an easy impedance matching can be obtained by adjusting the design parameters of the ground plane using such configuration.

Figure 5A:
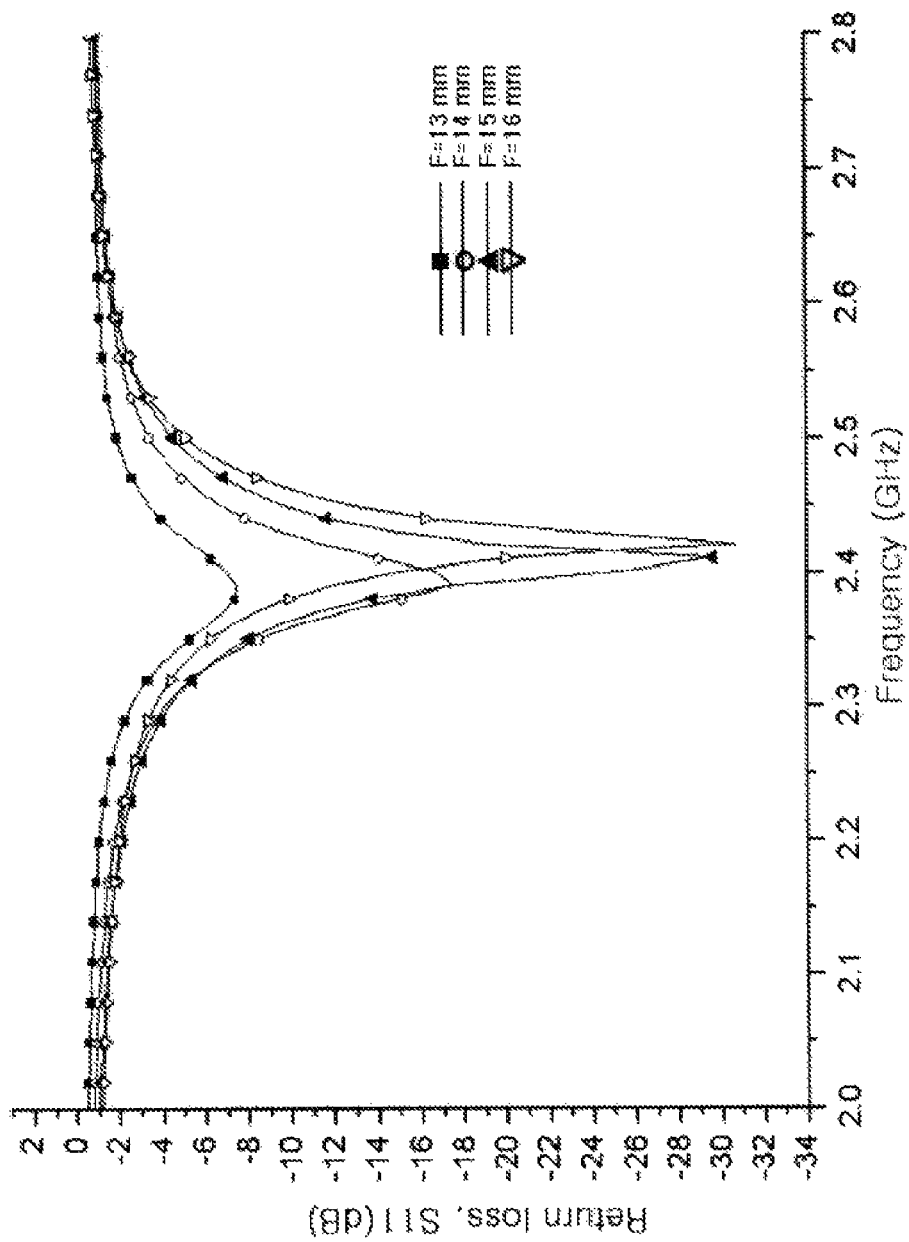
FIGS. 5a and 5b are example graphs illustrating simulated return loss values versus operating frequencies for different design parameters of a patch antenna in accordance with a preferred exemplary embodiment of the present invention.
Figure 5B:
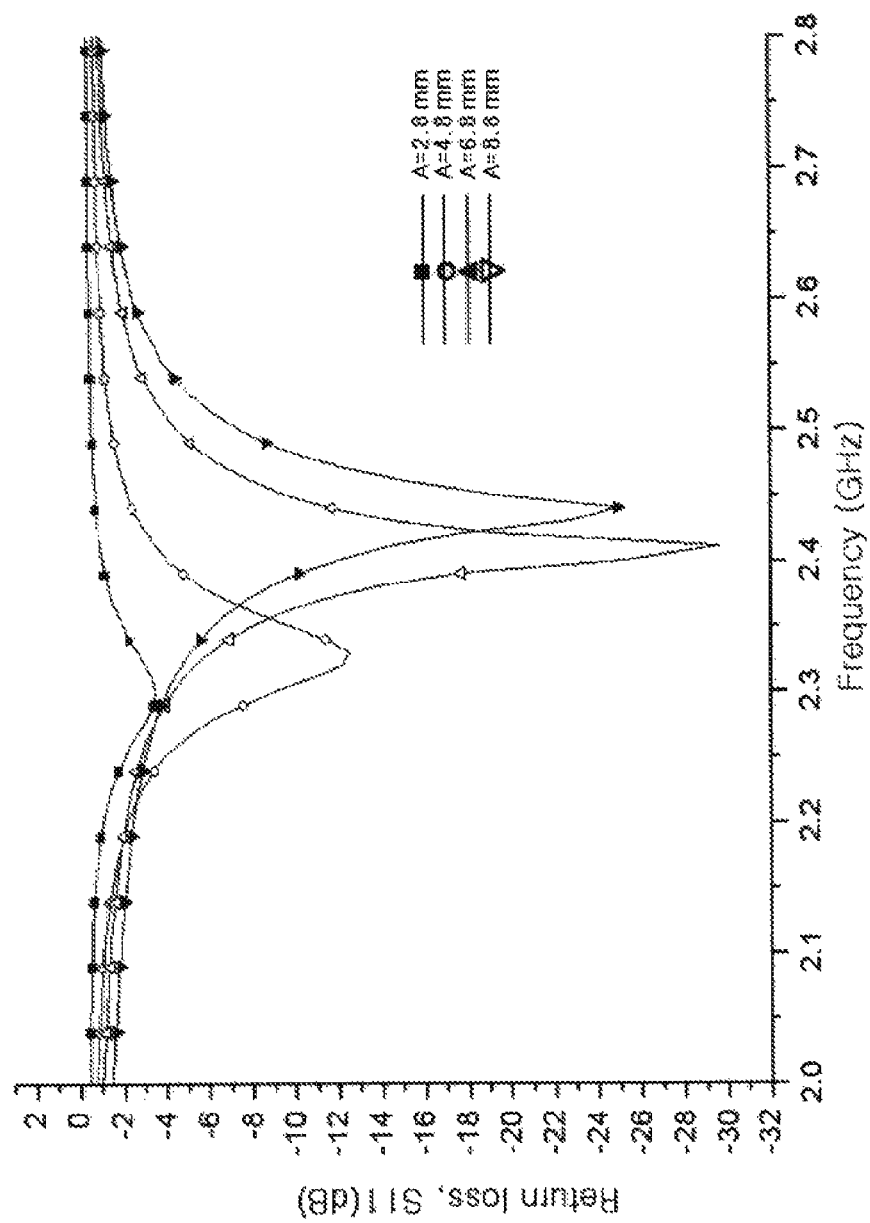

FIGS. 5a and 5b illustrate an example of return loss varying with the values of F and A, shown in FIG. 4, that are the design parameters of the antenna in accordance with the present invention.

As shown in FIGS. 5a and 5b, impedance matching can be achieved at frequencies around 2.4 GHz by adjusting the values of design parameters of F and A of the slot 4141 and the feeder line 4142; according to the simulation results, a return loss of near −30 dB can be obtained at frequencies around 2.4 GHz.

Table 1 provides examples of values of design parameters that are being adjusted so that a patch antenna in accordance with the present invention could have a linearly polarized wave characteristics at frequencies around 2.4 GHz

TABLE 1

| design parameter | value [mm] | design parameter | value [mm] |
| --- | --- | --- | --- |
| W | 29 | A | 7 |
| L | 29 | B | 17 |
| X | 43 | U | 1.865 |
| Y | 36 | F | 16 |

According to a patch antenna in accordance with a preferred exemplary embodiment of the present invention, it has the advantage that the variations in the frequency response characteristics caused by the tolerances are less pronounced compare to conventional in-set type structures; impedance matching can be achieved by simply adjusting the design parameters of the slot and the feeder line on the ground plane; therefore, additional fabrication of another patch can be avoided even when an impedance matching is failed.

Figure 6:
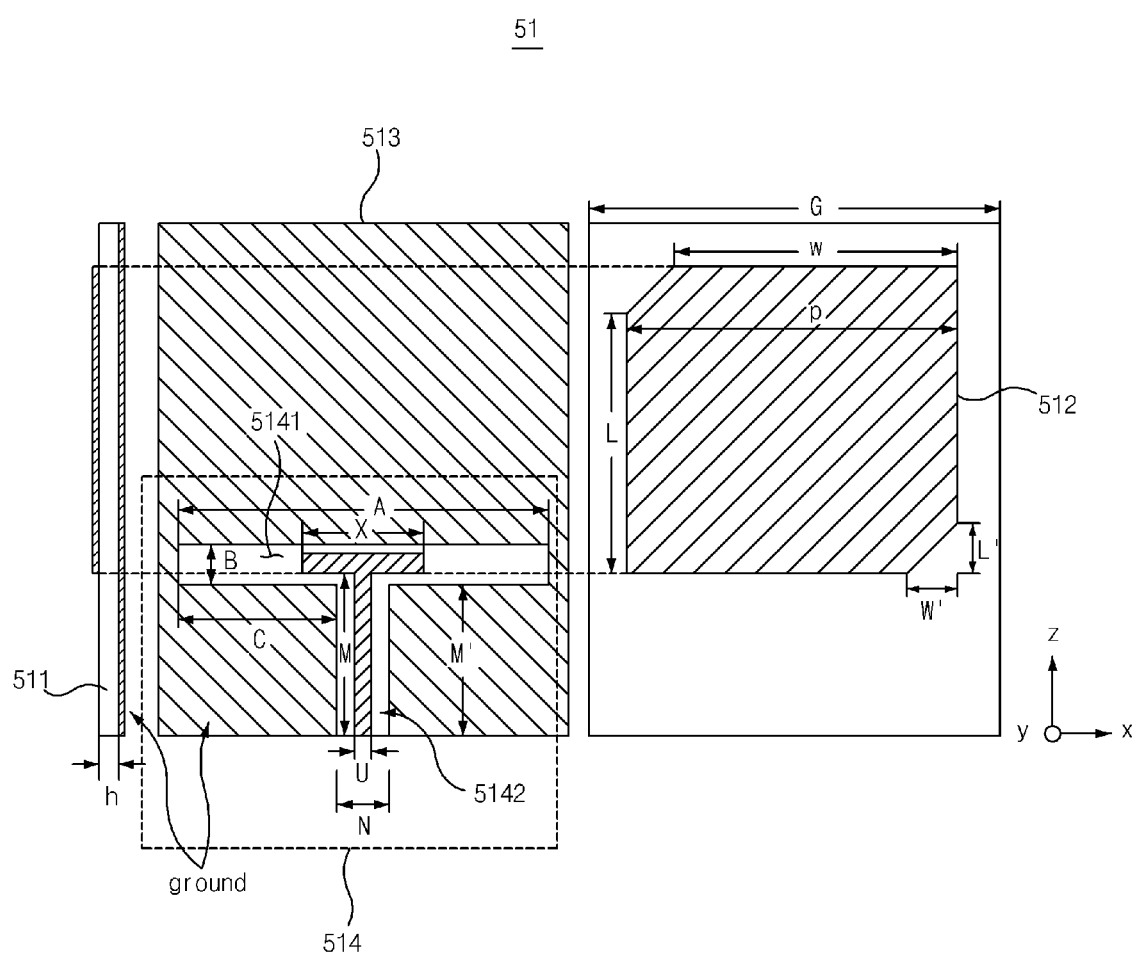
FIG. 6 is a schematic diagram of a patch antenna in accordance with another preferred exemplary embodiment of the present invention.
Figure 7:
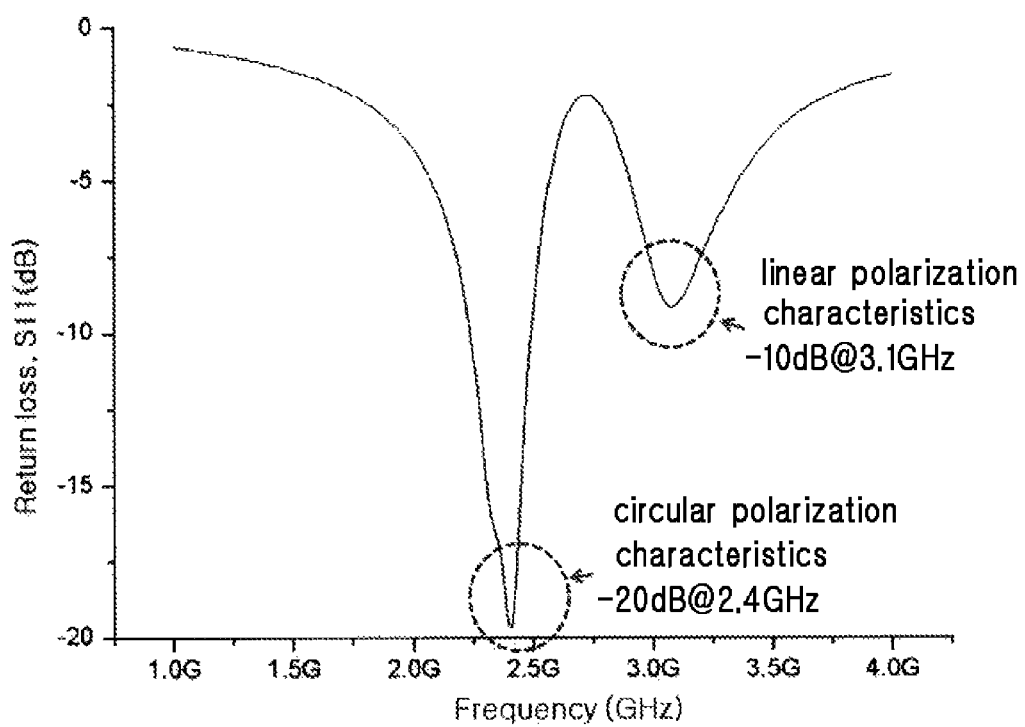
FIG. 7 is an example graph illustrating simulation and measured return loss values of a patch antenna in accordance with another preferred exemplary embodiment of the present invention.

A patch antenna 51 in accordance with another preferred exemplary embodiment of the present invention is illustrated in FIG. 6.

A patch antenna having two kinds of frequency band characteristics is provided in the another preferred exemplary embodiment of the present invention.

To achieve above-described capability, a patch antenna 51 in accordance with another preferred exemplary embodiment of the present invention is comprised of an impedance matching means 514 that is formed on the ground plane 513 and comprising a T-shaped slot 5141 and a T-shaped feeder line 5142 as shown in FIG. 6.

A patch antenna 51 in accordance with another preferred exemplary embodiment of the present invention enables an impedance matching by adjusting the design parameters of the T-shaped slot 5141 and the T-shaped feeder line 5142 as shown in FIG. 6; in addition, a dual-band patch antenna in accordance with the present invention can obtain previously mentioned second frequency response characteristics by adjusting the design parameters of the T-shaped slot 5141 and the T-shaped feeder line 5142, more particularly, by adjusting the values of the design parameters B, X, and M.

Table 2 provides examples of values of antenna design parameters that are being adjusted so that the patch antenna could have an additional frequency response characteristics at frequencies around 3.1 GHz

TABLE 2

| design parameter | value [mm] | design parameter | value [mm] | design parameter | value [mm] |
| --- | --- | --- | --- | --- | --- |
| W | 23.5 | A | 33 | y | 1.5 |
| L | 23.5 | B | 4 | U | 1.865 |
| W' | 3.5 | C | 14 | M | 15.4 |
| L' | 3.5 | X | 8 | M' | 14.5 |

According to another preferred exemplary embodiment of the present invention, a patch 512 can be a hexagonal shape formed by etching off two facing corners of a square as shown in FIG. 6; a patch antenna adopting such type of patch possesses a circularly polarized wave characteristics at frequencies around 2.4 GHz reflecting the design parameters of the particular patch shape, and possesses a linearly polarized wave characteristics at frequencies around 3.1 GHz reflecting the design parameters of the ground plane, but showing independence in patch size.

Through the above-described configuration, a patch antenna in accordance with another preferred exemplary embodiment of the present invention can handle not only two different frequency band signals, but also two different polarization types (i.e. a circular and a linear polarization).

Hereinafter, a rectenna in accordance with a preferred exemplary embodiment of the present invention will be described with reference to FIG. 8. In the following description, an element with the symbol number quoted from FIG. 6 is considered as equivalent as a corresponding element in FIG. 4 performing same function as the function of the corresponding element in FIG. 6, and vice versa.

Figure 8:
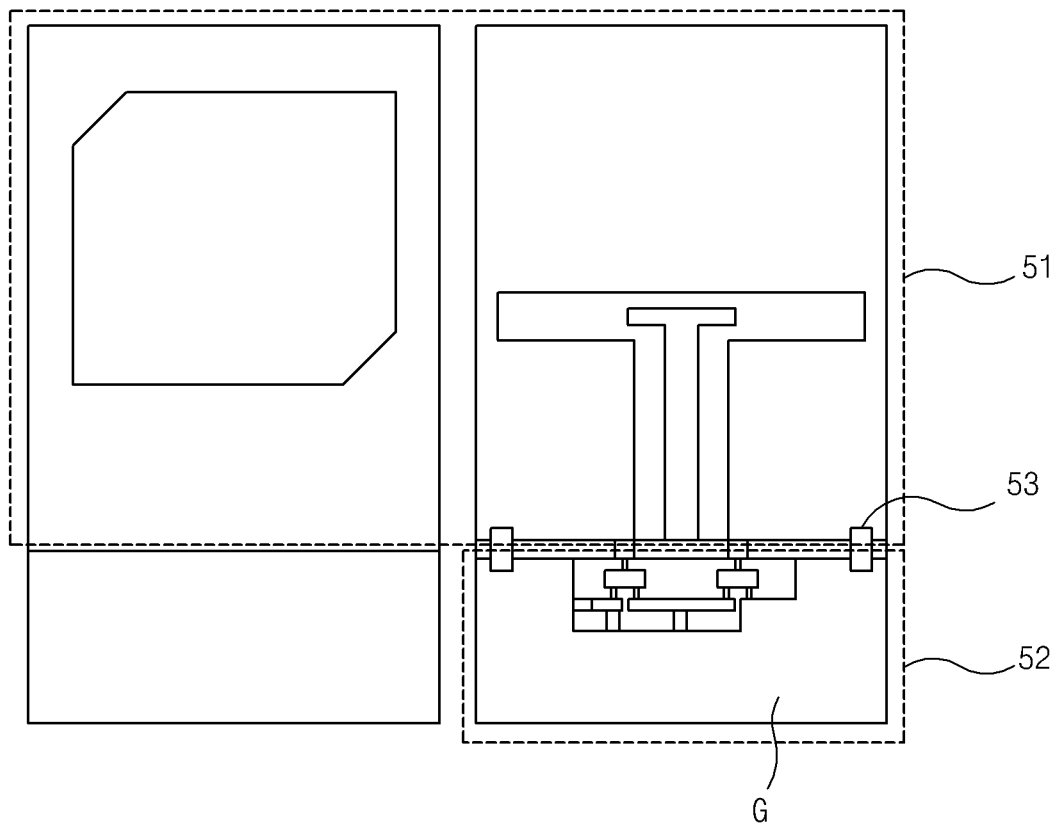
FIG. 8 is a schematic diagram of a rectenna in accordance with a preferred exemplary embodiment of the present invention.

FIG. 8 is a schematic diagram of a rectenna in accordance with a preferred exemplary embodiment of the present invention. A rectenna 50 in accordance with a preferred exemplary embodiment of the present invention is comprised of a patch antenna 51 and a rectifying unit 52 as shown in FIG. 8.

Since the patch antenna 51 in FIG. 8 has same function and configuration as the patch antenna shown in FIGS. 4 and 6, it will not be described hereinafter.

The rectifying unit 52 rectifies wireless signals received via the patch antenna 51, and converts the rectified signal into an electrical energy.

The rectifying unit 52 can be integrated on the same planar surface with the patch antenna 51 using the bottom area of the ground plane 513 of the patch antenna 51 as shown in FIG. 8; using such configuration, the total area of the rectenna 50 of the present invention can be reduced.

Figure 9:
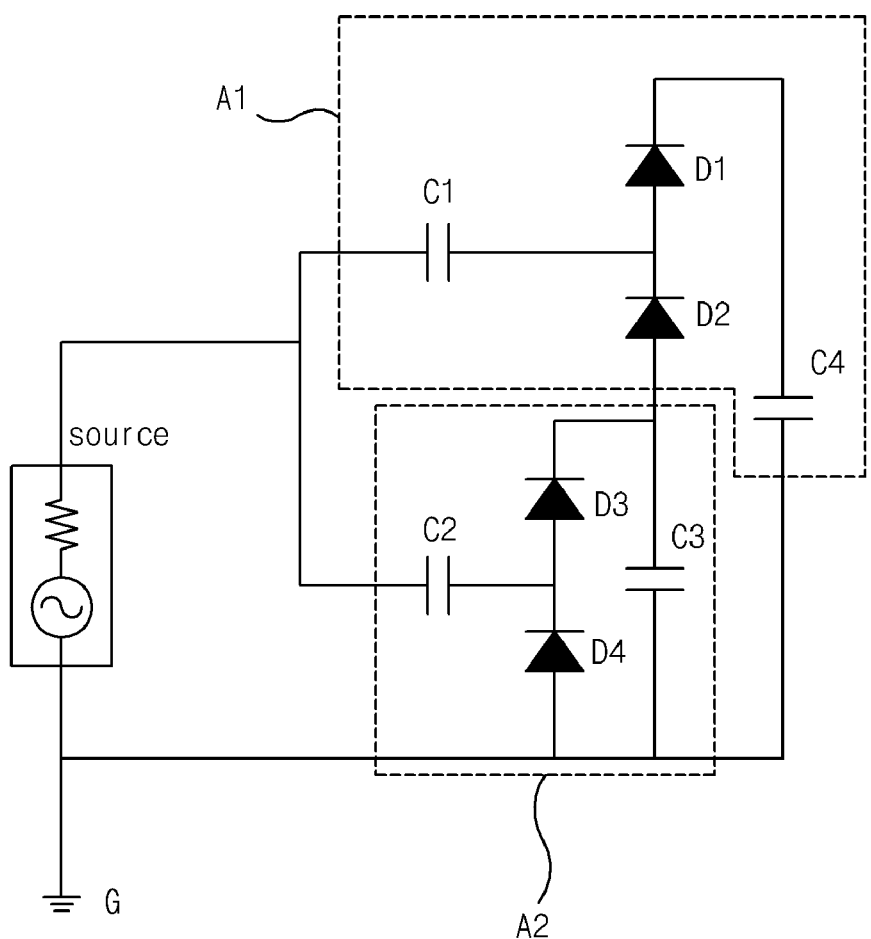
FIG. 9 is a detailed circuit diagram of the rectifying unit shown in FIG. 8.

Meanwhile, a detailed circuit diagram of the rectifying unit 52 is shown in FIG. 9. As shown in FIG. 9, the rectifying unit 52 is comprised of multiple capacitors C1 to C4 and multiple diodes D1 to D4, wherein at least two rectifying and multiplying stages A1 and A2, storing electrical energy by rectification effect, are serially connected, and the wireless signal received via the patch antenna 51 is rectified and converted into a D.C. electrical energy and the voltage is multiplied simultaneously.

More particularly, the rectifying unit 52 in accordance with the present invention is comprised of at least two rectifying and multiplying stages A1 and A2.

Individual rectifying and multiplying stages have capacitors C1, C2 and C3, connected between the serially connected diodes for temporary storage, and the storage capacitor C4; in addition, the rectifying and multiplying stages have forward biased diodes D1 and D3, and reverse biased diodes D2 and D4 with respect to the ground G.

When the input voltage is reverse direction (i.e. negative potential with respect to the ground), diodes D2 and D4 are turned on so as to charge C1 and C2 with electrical energy; later, when the input voltage is forward direction (i.e. positive potential with respect to the ground), electrical energy input coming through the forward biased diodes D1 and D3 is simultaneously superimposed on the discharging electrical energy from the capacitors C1 and C2 thereby voltage multiplication is achieved.

Each output voltage from each rectifying and multiplying stage is stored in the capacitors C3 and C4, and the electrical energy stored in the capacitor C3 eventually flows into the capacitor C4 due to the serially connected circuit configuration; therefore, the final voltage of the electrical energy stored in the capacitor C4 is much higher than the initial input voltage to the rectifying unit 52.

Although a rectifying unit configuration having only two rectifying and multiplying stages connected each other is described in this exemplary embodiment of the present invention, higher output voltage can be easily achieved by simply connecting more number of rectifying and multiplying stages.

Figure 10:
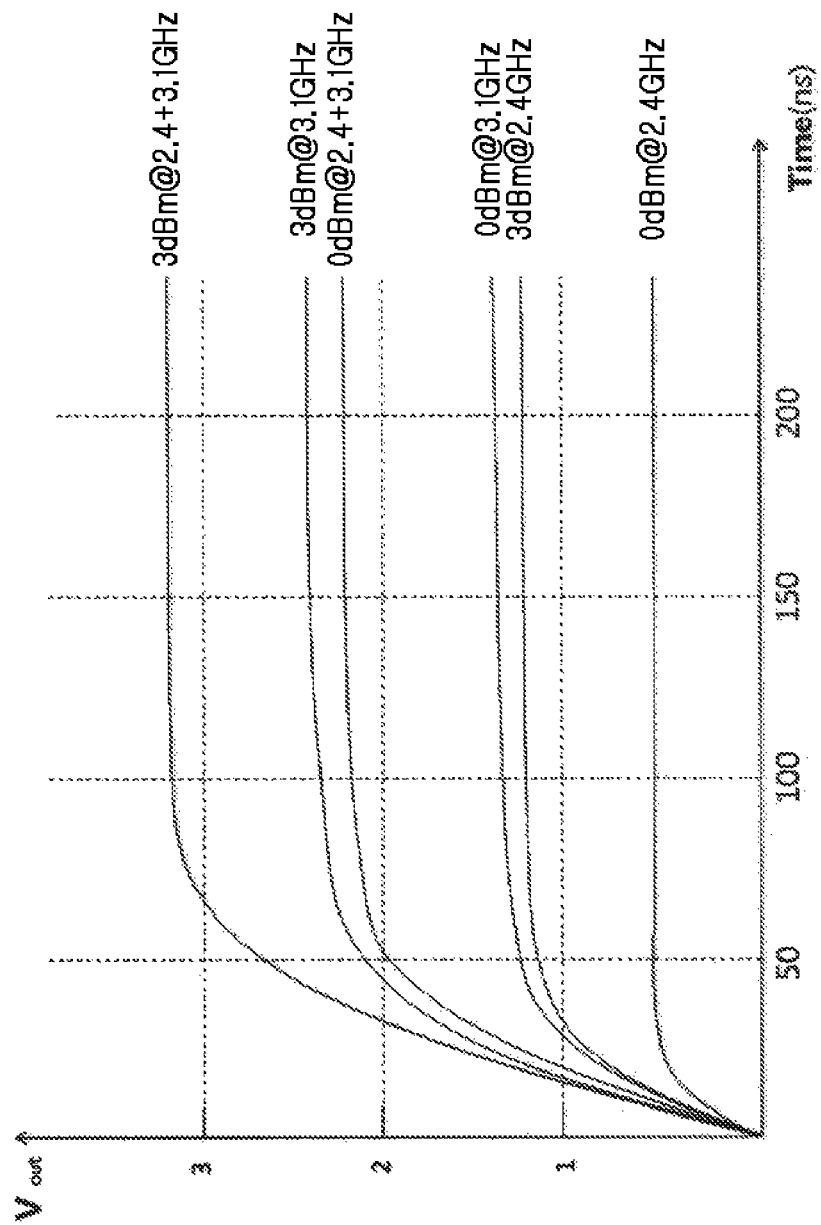
FIG. 10 is an example graph illustrating the simulated output values of the rectifying unit as a result of the voltage multiplication.

The graphs illustrating the results of rectification and multiplication of the received wireless signal is shown in FIG. 10.

As shown in FIG. 10, a higher output voltage can be obtained through voltage multiplication by using wireless signal in each individual frequency band, i.e. 2.4 GHz or 3.1 GHz; much higher output voltage can be obtained by using wireless signals in both frequency bands.

Meanwhile, the rectifying unit 52 comprises a grounding area G that is isolated from the ground plane 513 of the patch antenna 51, and may further comprise a bead 53 between the grounding area G of the rectifying unit 52 and the ground plane 513 of the patch antenna 51 as shown in FIG. 8.

The bead 53 may comprise an inductor; undesirable effects between RF and DC signals can be suppressed by such bead.

In the rectenna 50, for a good grounding of the rectifying unit 52, it is desirable that the grounding area G of the rectifying unit 51 is connected to the ground plane 513 that is the largest conductor; but direct connection of the ground of the patch antenna 51 that handles RF signal to the grounding area G of the rectifying unit 52 that handles D.C. signal could cause a change in the circuit characteristics deviating from the designers intention.

To prevent such problems, the ground plane 513 and the grounding area G is connected by an inductor so that the ground plane 513 and the grounding area G is electrically disconnected from each other for an A.C. signal while the ground plane 513 and the grounding area G is electrically connected to each other for a D.C. signal.

Through the above-described configuration, the rectifying unit 52 can be effectively grounded and undesirable changes in the circuit characteristics of the patch antenna 51 can be prevented too.

According to the previously described rectenna of the present invention, the rectenna converts received main wireless signal of linearly polarized wave into an electrical energy for supplying power in 3.1 GHz frequency band; at the same time, the rectenna additionally generates an electrical energy by receiving circularly polarized wireless signals in 2.4 GHz frequency band such as Wi-Fi, Bluetooth, or DMB signal; therefore, more stable and smooth power can be supplied even in case the reception of the main wireless signal is rather poor.

Although the present invention herein has been described in the above with reference to the exemplary embodiments, it will be apparent to those skilled in the art that various changes and modification may be made to the above described embodiments, without departing from the scope and spirit of the present invention as disclosed in the accompanying claims.

What is claimed is:

1. A patch antenna comprising:
   an dielectric substrate;
   a patch that is formed on a first surface of the dielectric substrate and provides a first frequency characteristics; and
   a ground plane that is formed on a second surface of the dielectric substrate,
   wherein an impedance matching means, that is capacitively coupled with the patch, is formed on one side of the ground plane;
   wherein the impedance matching means is comprised of: a T-shaped slot formed in a bottom area of the ground plane; and a T-shaped feeder line formed inside of the T-shaped slot and being separated by a predetermined distance therefrom; and
   wherein the T-shaped feeder line is formed at a location where a bar-shaped head of the T-shaped feeder line can face a bottom area of the patch so as to provide a second frequency characteristics by adjusting the size of the T-shaped slot and the T-shaped feeder line.

2. The patch antenna according to claim 1, wherein the patch is a hexagonal shape formed by etching off two facing corners of a square.

3. A rectenna for receiving an A.C. wireless signal carrying electrical energy, and converting the wireless signal into a D.C. electrical energy, comprising:
   a patch antenna for receiving the wireless signal comprised of a dielectric substrate, a patch that is formed at an upper area of one surface of the dielectric substrate and provides a first frequency response characteristics, a ground plane formed on the other surface of the dielectric substrate, and an impedance matching means that provides a second frequency response characteristics; and
   a rectifying unit for converting the wireless signal, received via the patch antenna, into a D.C. electrical energy by rectifying the wireless signal,
   wherein the rectifying unit is comprised of a voltage multiplying circuit that comprises at least one capacitor and diode and at least two of serially connected rectifying and multiplying stages capable of storing energy temporarily so as to convert the wireless signal into an electrical energy by rectifying the wireless signal and multiply the voltage of the converted electrical energy simultaneously.

4. The patch antenna according to claim 3, wherein the rectifying unit is further comprised of:

a grounding area that is being separated from the ground plane of the patch antenna; and a bead that is located between the grounding area and the ground plane of the patch antenna for suppressing the effect of the A.C. signal.

* * * * *